United States Patent
Kim et al.

(10) Patent No.: US 7,469,267 B2
(45) Date of Patent: Dec. 23, 2008

(54) METHOD AND SYSTEM FOR HOST DEVICE EVENT SYNCHRONIZATION

(75) Inventors: Ihn Kim, Laguna Niguel, CA (US); Aurelio J. Cruz, Aliso Viejo, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 772 days.

(21) Appl. No.: 10/878,595

(22) Filed: Jun. 28, 2004

(65) Prior Publication Data

US 2005/0289252 A1 Dec. 29, 2005

(51) Int. Cl.
*G06F 15/16* (2006.01)
(52) U.S. Cl. .................... 709/201; 709/200; 709/203; 711/100; 711/146
(58) Field of Classification Search .............. 709/203, 709/213, 214, 238, 200, 201; 711/114, 141, 711/144, 146, 100
See application file for complete search history.

(56) References Cited

U.S. PATENT DOCUMENTS

| | | | | |
|---|---|---|---|---|
| 5,860,110 A | * | 1/1999 | Fukui et al. ................. | 711/141 |
| 6,018,791 A | * | 1/2000 | Arimilli et al. .............. | 711/141 |
| 6,145,059 A | * | 11/2000 | Arimilli et al. .............. | 711/143 |
| 6,925,511 B2 | * | 8/2005 | Yoshida ....................... | 710/74 |
| 6,973,543 B1 | * | 12/2005 | Hughes ....................... | 711/141 |
| 7,194,587 B2 | * | 3/2007 | McCalpin et al. ........... | 711/144 |

* cited by examiner

*Primary Examiner*—Ario Etienne
*Assistant Examiner*—El Hadji M Sall
(74) *Attorney, Agent, or Firm*—Klein, O'Neill & Singh, LLP (57) ABSTRACT

A method and system for transferring control information between a host and network processor is provided. The system includes, a snooping module that is coupled to a snooping memory bus; a network cache controller; a host process scheduler that communicates with the network cache controller; and a host cache controller that controls a host cache for transferring control information without polling.

The method includes, invalidating a data block in a network cache, after a message is composed by the host processor; invalidating a status block in the network cache after the message is posted; and transferring control from the host processor to the network processor. The method also includes, invalidating a status segment in a network cache after data is transferred from a host cache to a network cache; and invalidating a status segment in the host cache after data has been injected to a network.

6 Claims, 6 Drawing Sheets

METHOD AND SYSTEM FOR HOST DEVICE EVENT SYNCHRONIZATION

BACKGROUND OF THE INVENTION

1. Field of the Invention

The present invention relates to computing systems, and more particularly, to improving performance of clustered systems.

2. Background

Conventional computer systems typically include several functional components. These components may include a central processing unit (CPU), main memory, input/output ("I/O") devices, and streaming storage devices (for example, tape drives) (referred to herein as "storage device").

In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The storage device is coupled to the host system via a controller that handles complex details of interfacing the storage devices to the host system. Communications between the host system and the controller is usually provided using one of a variety of standard I/O bus interfaces.

Typically, when data is read from a storage device, a host system sends a read command to the controller, which stores the read command into the buffer memory. Data is read from the device and stored in the buffer memory.

Commercial success of server and data storage systems triggered the evolution of "clustered systems" that use standard microprocessors, memory devices and operating systems. A cluster is a parallel or distributed system that includes a collection of interconnected computer systems or servers that operate as a single unified unit. Members of a cluster may be referred to as nodes or systems.

Clustering may be used for parallel processing or computing (similar to massively parallel processors ("MPP")) to simultaneously use two or more processing units ("CPU") to execute an application or program.

Clustered systems may be used in storage area networks ("SANs") using standard technologies (for example, the Fibre Channel standard based technology, incorporated herein by reference in its entirety). SAN allows storage systems to be shared among multiple clusters or servers. Storage devices may be configured as a redundant array of inexpensive disk ("RAID") configuration.

Figure 1A:
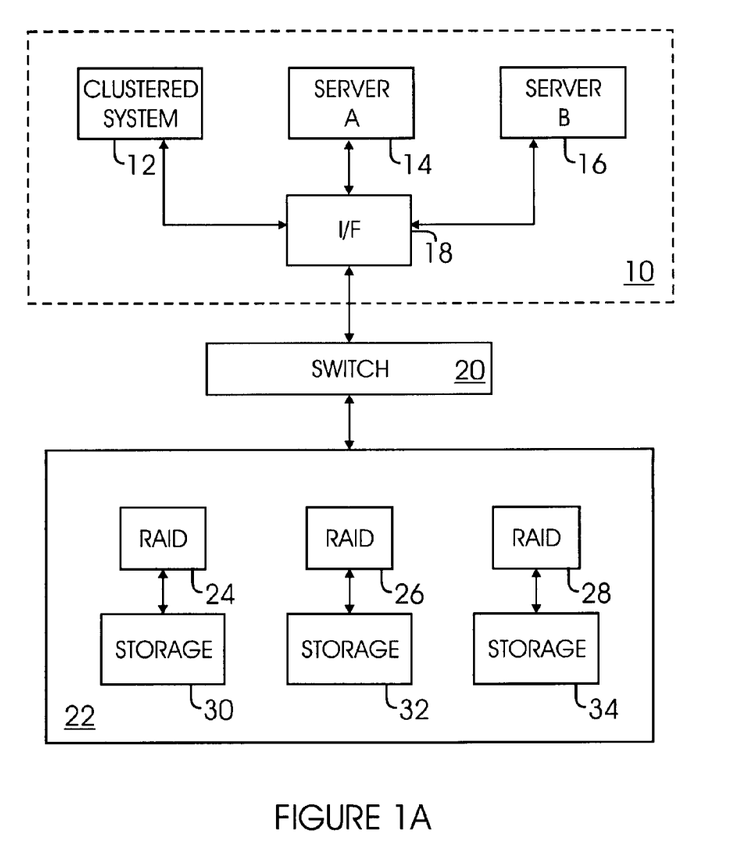
FIG. 1A is a block diagram of a network system used according to one aspect of the present invention.

FIG. 1A shows a block diagram of a network 10 using a cluster 12 with servers 14 and 16. Cluster 12 communicates with the network via interface 18. A switch 20 facilitates communication between network 10 and SAN 22 that includes storage 30, 32 and 34 with RAID controllers 24 26 and 28.

In clustered systems, processors use one or more caches (used interchangeably with memory devices) to temporarily store values that may be accessed by the processors. A clustered system uses a coherent memory system to maintain order for plural processors to perform write/read operations.

There are a number of protocols that may be used for achieving coherency for these multi-processor operations, for example, the MESI protocol, incorporated herein by reference in its entirety. The protocols allow one processor to write to a given memory location at any give time.

To implement coherency in a clustered system, processors communicate over a command interconnect system (for example, a PCI bus). The processors use the bus to send a message either to read or write data to memory locations. When an operation is placed on the interconnect system by a processor, other units monitor ("snoop") the operation and decide if their cache state allows the requested operation to proceed.

Figure 3:
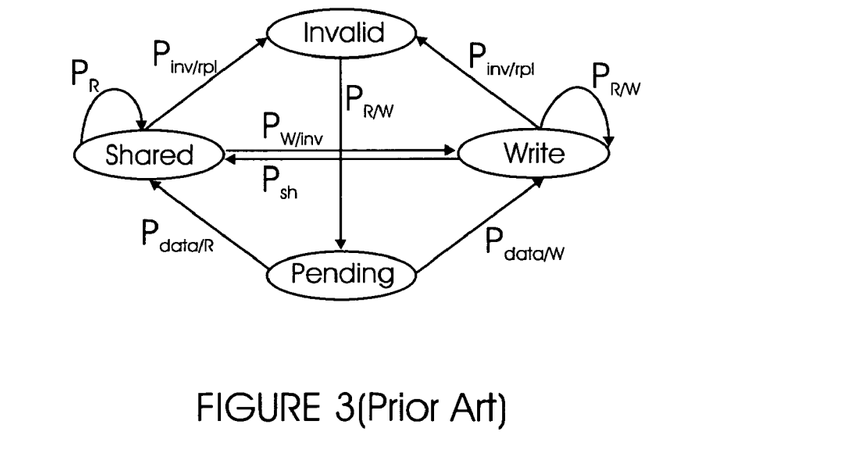
FIG. 3 is a state diagram of the prior art MESI protocol.

FIG. 3 shows a state diagram for the "MESI" protocol with four states:

Invalid (i.e., a cache is not valid);

Exclusive (valid memory and cache has one copy of the data);

Shared (more than one cache holds a copy of the data and memory is valid); and

Modified (data has been modified and the memory copy is invalid).

Under the MESI protocol, a cache which reads a copy of a modified value would switch from the Invalid state to the Shared state and the modified response is picked up by a memory controller to allow data to be written.

Figure 1B:
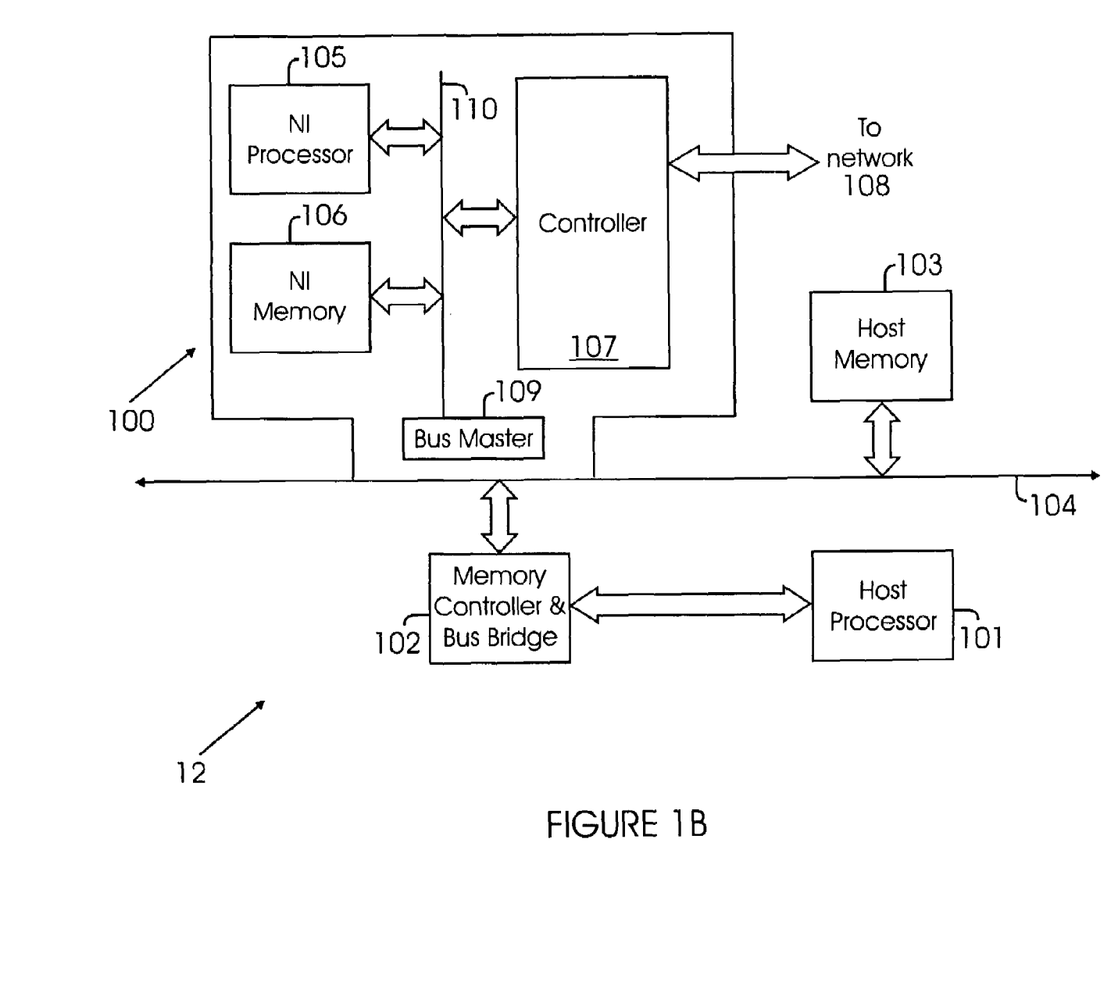
FIG. 1B shows a block diagram of a clustered system.

To improve the performance of clustered systems, network processors are used with host processors that allow user-level network ("ULN") access. FIG. 1B shows a block diagram using a network interface card ("NIC") in a clustered system 12. System 12 uses a host processor 101 that is coupled to a memory controller 102 allowing access to a computer bus 104. This allows host processor to communicate with host memory 103 and network 108 via NIC 100.

NIC 100 includes a network interface ("NI") processor 105 and NI memory 106. NI Processor 105 communicates with a controller 107 via bus 110. Controller 107 has a micro-controller, an error correction code engine, data flow controller, a transmit and receive unit to allow communication to and from system 12 via a network 108, described below.

It is noteworthy that network 108 may be Ethernet, Fibre Channel or any other standard or proprietary protocol based.

Clustered system performance is affected by software/hardware overheads. Communication using NIC 100 requires additional overhead that affects overall performance, as described below.

In a ULN architecture (FIG. 1B) each process uses a trusted entity at channel setup to provide direct and protected access to network 108. Overloading the virtual memory mechanisms of the host operating system ("OS") typically provides the protection. By selectively mapping the message area and endpoints, processes are protected from accidental and/or malicious hampering of their network access paths.

Typically, each endpoint in a ULN has a pair of queues (Send Queue to send messages and Receive Queue to receive messages) and a "descriptor". The descriptor includes information for sending/receiving messages. To send a message, the user (host processor 101) process selects a memory region through the OS and composes a message in the message area. A descriptor for the message is posted in the send queue. When NI processor 105 "views" the posted message. it programs its direct access memory ("DMA") engine and the messages are copied to NI buffers (for example, 106). The notification or pending messages to and from host 101 and NIC 100 may be accomplished using a "doorbell" mechanism which typically involves conditional busy-waiting. Similar actions are performed on the receive side.

Figure 2:
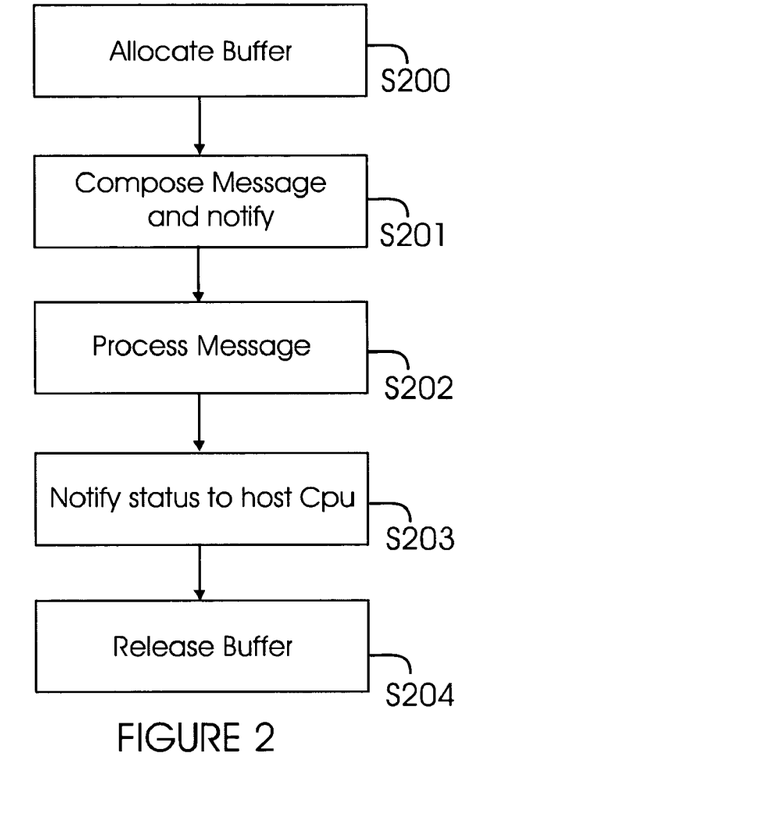
FIG. 2 is a flow diagram showing how control information is used in a prior art clustered system.

FIG. 2 shows a top-level flow diagram for communication between host processor 101 and NIC 100. In step S200, host processor 101 allocates buffer space in NI memory 106 and copies data. In step S201, host processor 101 composes a message for NIC 100 and notifies NIC 100. At this stage NI processor 105 takes control of the "message" send operation.

In step S202, NI processor 105 processes the message. In step S203, NI processor 105 notifies host processor 101 that the message has been sent out (or injected) to network 108. Once again control transfer occurs. This time it is from NI processor 105 to host processor 101. Thereafter, host processor 101 releases the message buffers. Typically, message buffers in NIC 100 are preserved until an acknowledgement message is received from the message receiver of successful reception.

As discussed above, some type of control transfer occurs between host processor 101 and NI processor 105 and it is not easy to hide this control information exchange-overhead in common messaging paths. In conventional systems, host processor 101 polls NIC 100 for confirmation information and NI processor 105 polls for pending requests from host processor 101. This "busy-wait" process consumes host processor 101 and NI processor 105's computing power, while both processors could be doing other work.

The polling also requires memory bus-transactions and is often performed at pre-determined intervals. Polling transactions also reduce the overall memory bus bandwidth.

Therefore, there is a need for a method and system to efficiently synchronize host and NIC communication.

SUMMARY OF THE INVENTION

In one aspect of the present invention a method for transferring control information between a host and network processor is provided. The method includes, invalidating a data block in a network cache, after a message is composed by the host processor; invalidating a status block in the network cache after the message is posted; and transferring control from the host processor to the network processor. A host cache controller writes data to a host cache and transfer of control information occurs without any polling.

In yet another aspect, a method for transferring control information between a host and network processor is provided. The method includes, invalidating a status segment in a network cache after data is transferred from a host cache to an network cache; and invalidating a status segment in the host cache after data has been injected to a network.

In yet another aspect of the present invention, a system for transferring control information between a between a host and network processor is provided. The system includes, a snooping module that is coupled to a snooping memory bus; a network cache controller that can support a memory bus cache coherency protocol; a host process scheduler that communicates with the network cache controller; and a host cache controller that controls a host cache for transferring control information without polling.

In one aspect of the present invention, "conditional polling" necessary for passing control transfer in conventional networks is reduced or eliminated. A "snooping bus" and a process scheduler are used so that network events can be synchronized with a local host processes without wasting hardware resources.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a controller will initially be described. The specific architecture and operation of the preferred embodiment will then be described with reference to the general architecture.

Figure 1C:
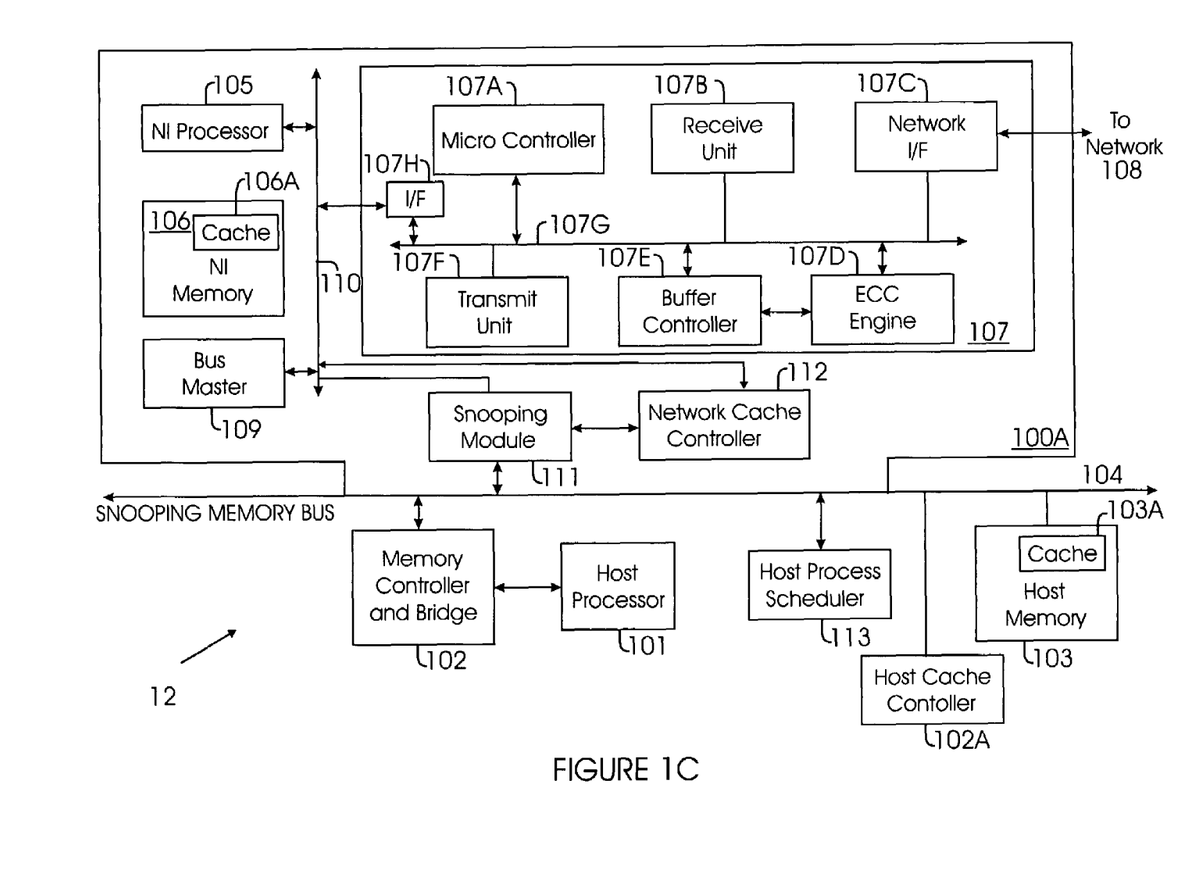
FIG. 1C shows a block diagram of a clustered system, according to one aspect of the present invention.

FIG. 1C shows a block diagram of a clustered system 12, which includes a network interface card 100A with a controller 107 coupled to computer bus 110. Controller 107 has an internal micro-controller 107A (that may be any type of processor, including a reduced instruction set computer ("RISC")) that interfaces with plural components via an internal bus 107G. Controller 107 includes a buffer controller 107E that controls access to a buffer memory (not shown), an error code correction ("ECC") module 107D that performs error correction for data that is moved in and out of NIC 100A.

A receive unit 107B and a transmit unit 107F are used to move data in and out of NIC 100A. Controller 107 also includes a direct memory access ("DMA") engine (not shown) that allows access to bus 107G. Interface 107H allows components within controller 107 to communicate using bus 110.

Bus master 109 arbitrates access and control of bus 104. NI memory 106 includes a cache 106A, the use of which is described below, with respect to the adaptive aspects of the present invention.

In one aspect of the present invention, a "snooping module" 111 is provided that monitors bus 104 for messages. A network cache controller 112 is also provided to control cache 106A and supports a cache coherency protocol (for example, MESI (FIG. 3)), as described below, with respect to an adaptive aspect of the present invention.

Firmware running on controller 107 or a state machine (not shown) can schedule pending requests for network access.

Clustered system 12 includes a host process scheduler 113 that communicates with host cache controller 102A and network cache controller 112 regarding cache coherency transactions. Host memory 103 includes cache 103A that stores information for notifying host process scheduler 113 of network interface coherency transactions.

It is noteworthy that the foregoing modules have been shown to illustrate the functional aspects of the present invention and are not intended to limit the present invention. For example, the modules shown above can be combined or separated to achieve the objectives of the present invention.

Figure 4:
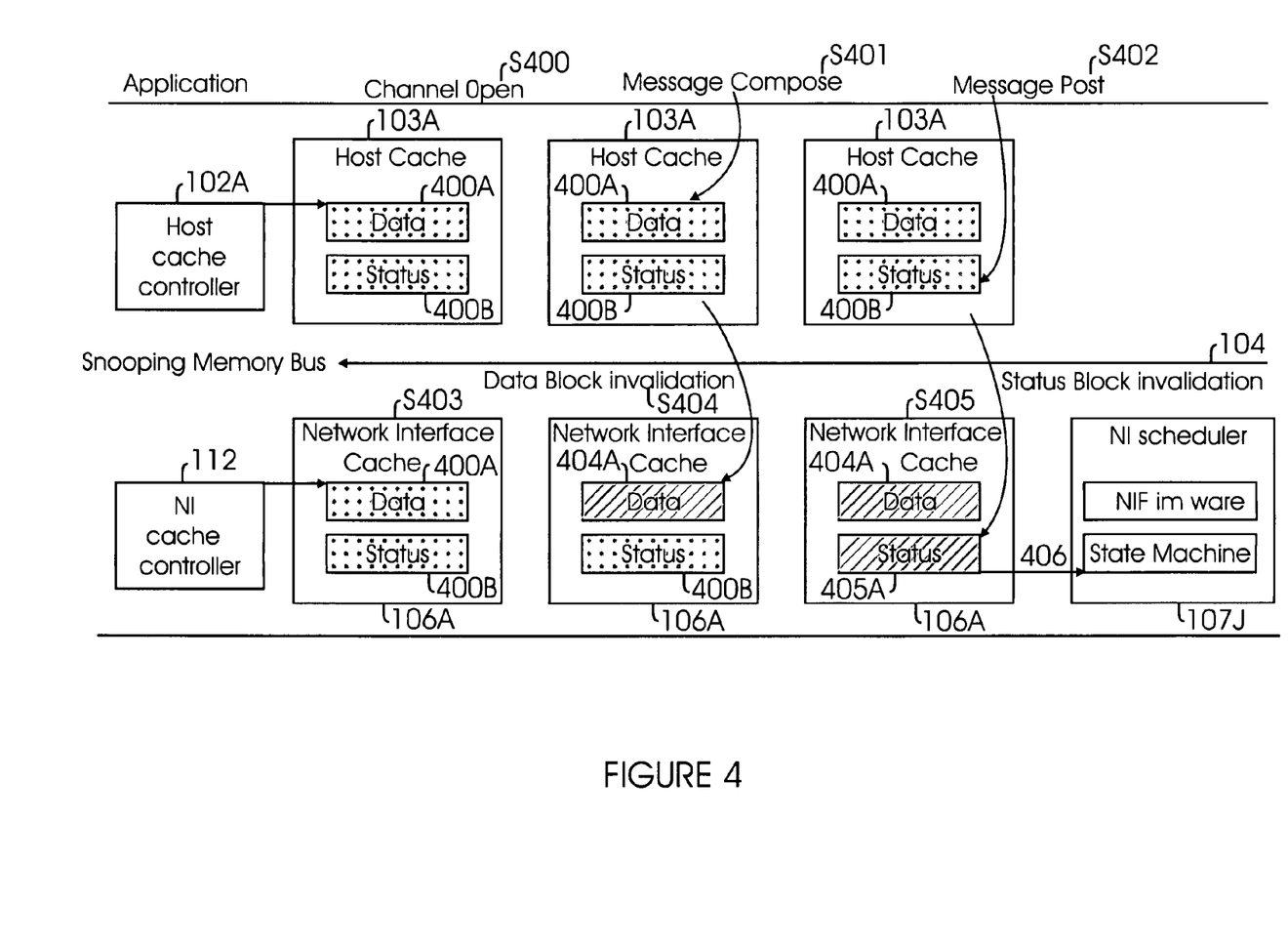
FIGS. 4 and 5 show a flow diagram of how control transfer occurs, according to one aspect of the present invention.
Figure 5:
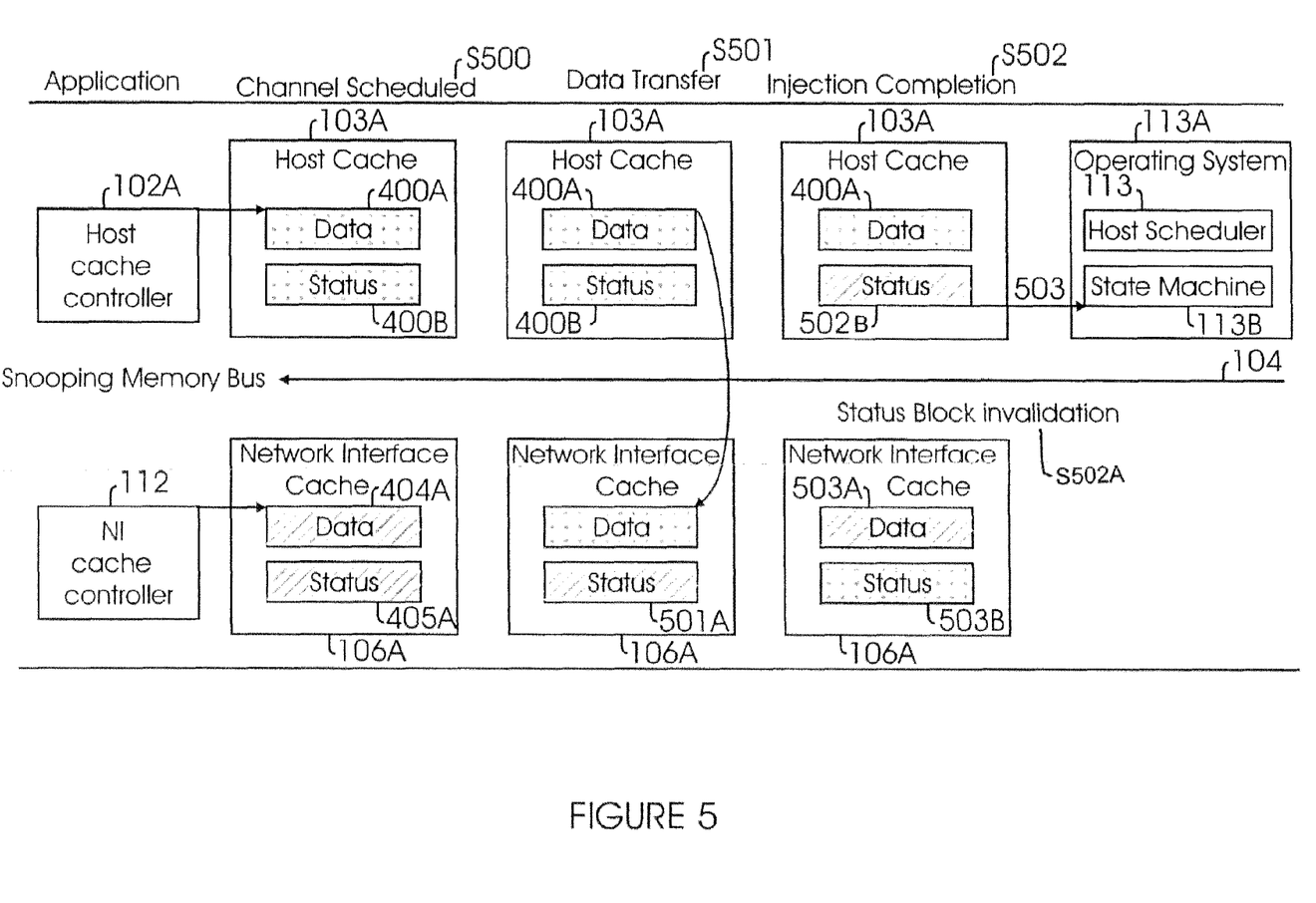

FIGS. 4 and 5 show various process steps for transferring control between host processor 102 and NI processor 105, according to one aspect of the present invention.

In FIG. 4, the process flow diagram shows transfer of control information from host processor 102 to NI processor 105. In step S400, the channel between system 12 and network 108 is open and host processor 101 desires to write in cache 103A. The written segment includes two components, a data block 400A and a status block 400B.

In step S403, snooping module 111 detects that data is being written in host cache 103A. In step S401, a message is composed, which includes data 400A and status segment 400B. The message is posted in step S402.

In step S404, the host cache controller 102A invalidates the data segment, shown as 404A in FIG. 4. In step S405, the host cache controller 102A invalidates status segment, shown as 405A. In step S405, a message 406 is sent to NI Scheduler 107J that passes control from host 101 to NI processor 105.

In one aspect of the present invention, no polling is required and hence network processor 105 resources are not wasted.

FIG. 5 shows a flow diagram for passing control from NI processor 105 to host processor 101 for releasing the buffers. In step S500 a channel for data transfer is scheduled. Data 400A and status 400B (from FIG. 4) are shown in host cache 103A and are controlled by host cache controller 102A. Also, data 404A and status 405A that are invalidated are shown in NI cache 106A that is controlled by NI cache controller 112.

In step S501, data is transferred from host cache 103A to NI cache 106A. Data 400A is moved and status 501A is still invalidated in NI cache 106A.

In step S502A, after data is injected into the network 108, status 503B is validated in NI cache 106A and data 503A is invalidated. In step S502, status 502B is invalidated in host cache 103A. Thereafter, control from NI processor 105 is passed to host processor 101 via message 503. Control is passed to operating system 113A on the host side. Operating system 113A interacts with host scheduler 113 and state machine 113B trigger the process to send data to host processor 101.

In one aspect of the present invention, a method and system is provided such that memory bus transactions do not require redundant polling for transferring control.

Although the present invention has been described with reference to specific embodiments, these embodiments are illustrative only and not limiting. Many other applications and embodiments of the present invention will be apparent in light of this disclosure.

What is claimed is:

1. A method for transferring control information from a host processor for a host computing system to a network processor for a network interface card operationally coupled to a network, the host computing system communicating with the network via the network interface card, comprising:

detecting when data is being written by a host cache controller in a host cache; wherein a snooping module coupled to a memory bus detects if data is being written to the host cache;

composing a message with at least a data block and a status block, wherein the host processor composes the message;

invalidating the data block in a network cache of the network interface card, after the host processor composes the message;

invalidating the status block in the network cache after the message is posted;

sending a message to a network interface scheduler for transferring control from the host processor to the network processor; and transferring control information from the host processor to the network processor, wherein the network interface scheduler passes control from the host processor to the network processor.

2. The method of claim 1, where the host cache controller writes data to the host cache when a channel between the host processor and the network is open.

3. The method of claim 1, wherein transfer of control information from the host processor to the network processor occurs without any polling by the network processor.

4. A method for transferring control information from a network processor for a network interface card operationally coupled to network to a host processor for a host computing system, where the host computing system communicates with the network via the network interface card, comprising:

scheduling a channel for transfer of information to the network via the network interface card, while a data block and a status block controlled by host cache controller wait in a host cache for the host computing system; and the data block and the status block are in an invalidated state in a network cache for the network interface card, where the network cache is controlled by a network interface cache controller;

transferring the data block from the host cache to the network cache, while the status block continues to be in an invalidated state in the network cache;

validating the status block in the network cache; invalidating the data block in the network cache and invalidating the status block in the host cache, after the data block is sent to the network; and transferring control information from the network processor to the host processor via a message.

5. The method of claim 4, wherein transfer of control information from the network processor to the host processor occurs without any polling.

6. The method of claim 4, wherein control is passed by the network processor to an operating system executed by the host computing system.

* * * * *

UNITED STATES PATENT AND TRADEMARK OFFICE
CERTIFICATE OF CORRECTION

| | |
|---|---|
| PATENT NO. | : 7,469,267 B2 |
| APPLICATION NO. | : 10/878595 |
| DATED | : December 23, 2008 |
| INVENTOR(S) | : Ihn Kim et al. |

It is certified that error appears in the above-identified patent and that said Letters Patent is hereby corrected as shown below:

In column 1, line 56, after "24" insert -- , --.

In column 2, line 57, delete "message." and insert -- message, --, therefor.

In column 6, line 28, in Claim 4, after "coupled to" insert -- a --.

In column 6, line 33, in Claim 4, after "controlled by" insert -- a --.

Signed and Sealed this

Eleventh Day of May, 2010

David J. Kappos
*Director of the United States Patent and Trademark Office*